(12) United States Patent
Kimura et al.

(10) Patent No.: US 6,212,140 B1
(45) Date of Patent: Apr. 3, 2001

(54) OBJECTIVE LENS DRIVING DEVICE AND OPTICAL DISK UNIT

(75) Inventors: Katsuhiko Kimura; Seiichi Kato, both of Ibaraki-ken; Hiroshi Saito, Yokohama; Hiroyasu Yoshida, Fujisawa; Fumihito Ichikawa, Yokohama; Satoshi Shinada, Fujisawa, all of (JP)

(73) Assignees: Hitachi, Ltd., Tokyo; Hitachi Media Electronics Co., Ltd., Iwate-ken, both of (JP)

( * ) Notice: Subject to any disclaimer, the term of this patent is extended or adjusted under 35 U.S.C. 154(b) by 0 days.

(21) Appl. No.: 09/391,407

(22) Filed: Sep. 8, 1999

(30) Foreign Application Priority Data

Sep. 8, 1998 (JP) .................................................. 10-253494

(51) Int. Cl.[7] ...................................................... G11B 7/00
(52) U.S. Cl. ...................................... 369/44.15; 369/44.14
(58) Field of Search .............................. 369/44.14, 44.15, 369/44.16, 44.22; 359/813, 814, 823, 824

(56) References Cited

U.S. PATENT DOCUMENTS

| | | | |
|---|---|---|---|
| 4,646,283 | * 2/1987 | Ito et al. | 369/44.15 X |
| 4,750,164 | * 6/1988 | Nose | 369/44.15 X |
| 5,208,703 | * 5/1993 | Ikegame et al. | 369/44.15 X |
| 5,548,449 | * 8/1996 | Matsui et al. | 369/44.15 X |

FOREIGN PATENT DOCUMENTS

| | | |
|---|---|---|
| 6-4885 | 1/1994 | (JP) . |
| 7-320278 | 12/1995 | (JP) . |
| 8-297846 | 11/1996 | (JP) . |

\* cited by examiner

Primary Examiner—Paul W. Huber
(74) Attorney, Agent, or Firm—Antonelli, Terry, Stout & Kraus, LLP (57) ABSTRACT

In a background-art optical disk drive, it is necessary to improve acceleration generated in an objective lens driving device in order to make an objective lens track a disk rotating at a high speed. This can be achieved either by increasing a thrust force acting on a movable body including the objective lens or by making the movable body lighter in weight. One method for increasing the thrust force is to make permanent magnets larger or use permanent magnets having a large magnetic force. However, this leads to such a problem that the unit becomes larger in size or higher in cost. In order to solve the foregoing problem, an inner yoke is disposed around a beam of light and inside the movable body of the objective lens driving device. Alternatively, an inner yoke having at least two sides substantially parallel with the radial direction of the disk and at least two sides substantially perpendicular thereto is disposed inside the movable body.

6 Claims, 6 Drawing Sheets

OBJECTIVE LENS DRIVING DEVICE AND OPTICAL DISK UNIT

BACKGROUND OF THE INVENTION

The present invention relates to a device for driving an objective lens of an optical disk. Particularly, the present invention relates to an objective lens driving device which can effectively drive an objective lens for collecting light onto a recording surface of an optical disk so as to move the objective lens in the focusing direction and the tracking direction, and relates to an optical disk drive using such an objective lens driving device.

Examples of background-art objective lens driving devices include those which are disclosed, for example, in JP-A-6-4885, JP-A-7-320278 and JP-A-8-297846.

In the objective lens driving device disclosed in JP-A-6-4885, a pair of magnets are disposed so that opposite magnetic poles are provided on the right and left while the same poles face each other, and extension portions of a yoke are provided between the same poles of the respective magnets which poles are facing each other, in order to keep the leakage of magnetic flux to a minimum.

In the objective lens driving device disclosed in JP-A-7-320278, plate-like magnetic substances each having a surface substantially perpendicular to the tracking direction are provided at the tracking-direction opposite ends of a fixed base in order to make the distribution of magnetic flux density uniform in the tracking direction in a magnetic air-gap portion to thereby prevent influence of leakage magnetic flux from a turn table or the like.

In the objective lens driving device disclosed in JP-A-8-297846, a yoke of a magnetic substance has a substantial U-shape so as to hold a permanent magnet and at least one of a focusing coil and a tracking coil between opposite portions of the yoke in order to make magnetic flux generated from the magnet interlink at right angles with a current flowing in the coil to thereby generate a thrust force for moving an objective lens effectively.

However, in such a background-art objective lens driving device, for example, in the configuration disclosed in JP-A-6-4885, the area of the yoke facing the magnets is small so that magnetic flux from the magnets cannot be kept at right angles to a coil. Therefore, the configuration is not always sufficient in a point that a thrust force for driving an objective lens is obtained effectively.

In the configuration disclosed in JP-A-7-320278, the plate-like magnetic substances are outside a focusing coil. Accordingly, the plate-like magnetic substances attract magnetic flux from a magnet in parallel with the tracking direction aggressively, so that a force opposite to an effective thrust force acts on the focusing coil. Therefore, also this configuration is not always sufficient for obtaining a thrust force for driving an objective lens effectively.

Further, in the configuration disclosed in JP-A-8-297846, an auxiliary yoke is outside the focusing coil. Accordingly, the auxiliary yoke attracts magnetic flux from a magnet in parallel with the tracking direction aggressively, so that a force opposite to an effective thrust force acts on the focusing coil. Therefore, also this configuration is not always sufficient for obtaining a thrust force for driving an objective lens effectively.

SUMMARY OF THE INVENTION

Taking such problems into consideration, it is an object of the present invention to provide an objective lens driving device in which unnecessary magnetic flux acting on a coil is reduced so that a thrust force is generated effectively, and which is intended to be small in size and light in weight. Further it is another object of the present invention to provide an optical disk drive capable of high-speed response by using such an objective lens driving device.

In order to attain the foregoing objects, an objective lens driving device according to the present invention is provided with a movable body, supports, a fixation member, a permanent magnet, and an inner yoke. The movable body is constituted by: objective lens for collecting light onto a recording surface of an optical disk which is an information recording medium; a lens holder holding the objective lens; focusing and tracking coils disposed in the lens holder. The supports are provided to support the movable body movably in the direction of the optical axis of the objective lens and in the direction of the radius of the optical disk. The fixation member is provided to fix the supports. The permanent magnet is provided to give a magnetic force to the movable body. The inner yoke is constituted by a magnetic substance member, and disposed inside the movable body so as to enclose a light path without blocking off light to the objective lens.

DESCRIPTION OF THE EMBODIMENTS

Embodiments of the present invention will be described below with reference to the drawings.

Figure 1:
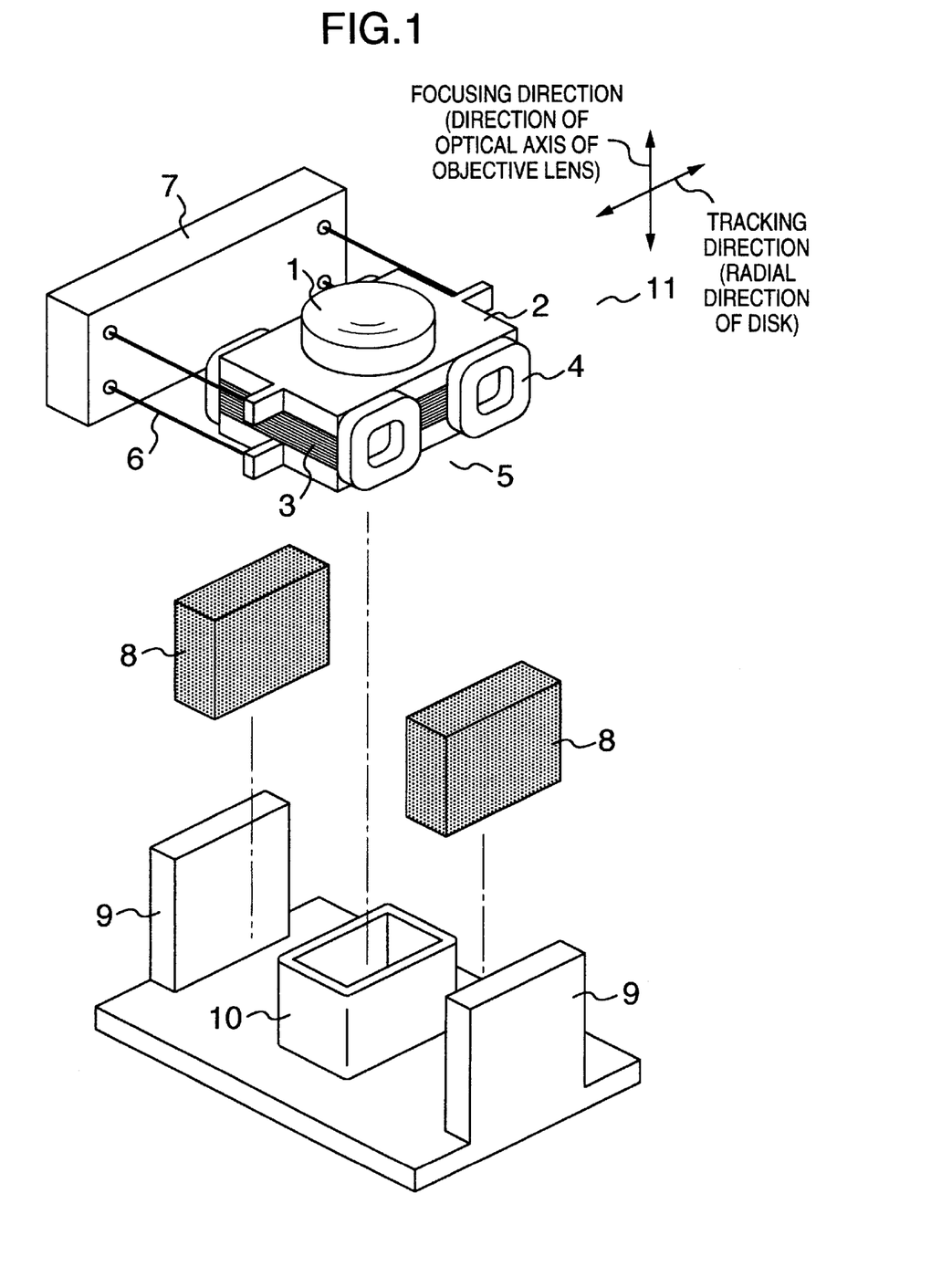
FIG. 1 is a view illustrating the configuration of an objective lens driving device according to the present invention.

FIG. 1 is an exploded perspective view illustrating the configuration of an embodiment of an objective lens driving device according to the present invention.

In FIG. 1, an objective lens driving device 11 is constituted by a movable body 5 including an objective lens 1; supports 6 constituted by an elastic body such as a spring, hard rubber or the like for supporting this movable body 5; a fixation member 7 for fixing the supports 6; permanent magnets 8 giving a magnetic force to the movable body 5; and outer and inner yokes 9 and 10 constituted by a magnetic substance. The movable body 5 is constituted by the objective lens 1; a lens holder 2 for holding the objective lens 1; a focusing coil 3 wound around the lens holder 2; and a tracking coil 4 disposed on the side surface of the lens holder 2 so as to be opposite to the permanent magnets 8. The inner yoke 10 is formed into a substantially hollow square-pole shape as shown in FIG. 1. The inner yoke 10 is designed so as to be included in a recess portion which is provided in the lens holder 2 and which is larger than the outer shape of the inner yoke 10 so that the inner yoke 10 does not contact with any portion. In addition, the fixation member 7 is fixed directly or indirectly to a casing of a not-shown optical disk unit.

Figure 3A:
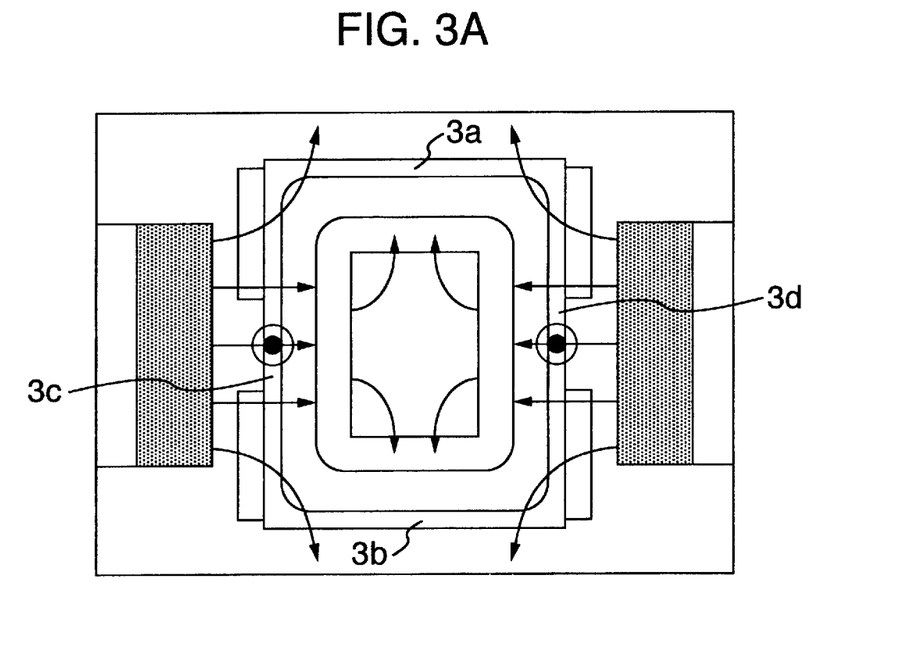
FIG. 3A is a plan view illustrating the flow of magnetic flux in the objective lens driving device according to the present invention.
Figure 3B:
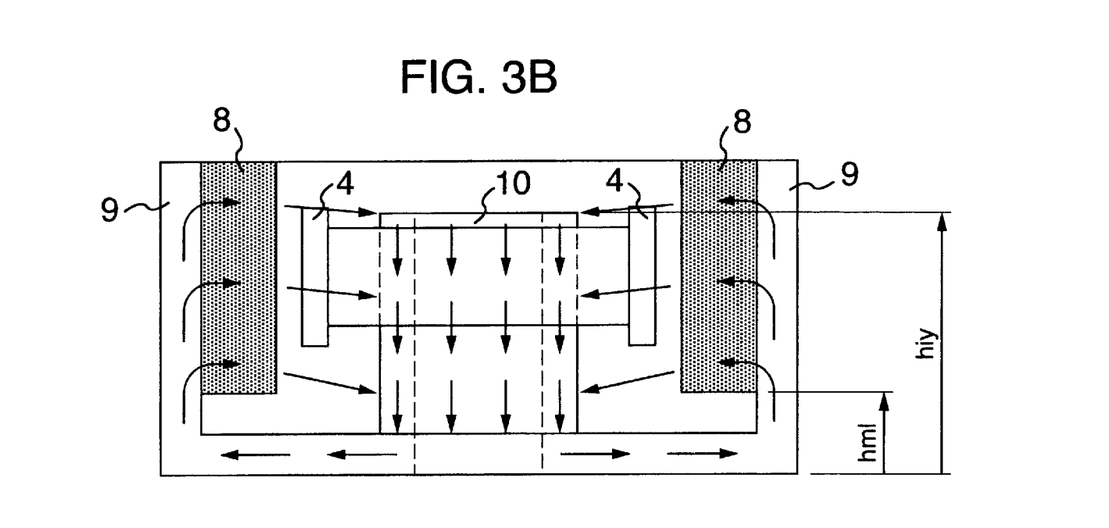
FIG. 3B is a side view illustrating the flow of magnetic flux in the objective lens driving device according to the present invention.

With the configuration, magnetic flux formed between the outer and inner yokes 9 and 10 and a current flowing into the focusing coil 3 are controlled so as to dispose the objective lens 1 in a predetermined position. In this invention, the inner yoke 10 is formed into the above-mentioned shape so as to reduce leakage magnetic flux to make it possible to drive the objective lens effectively. The detail will be described later with reference to FIG. 3.

Figure 2:
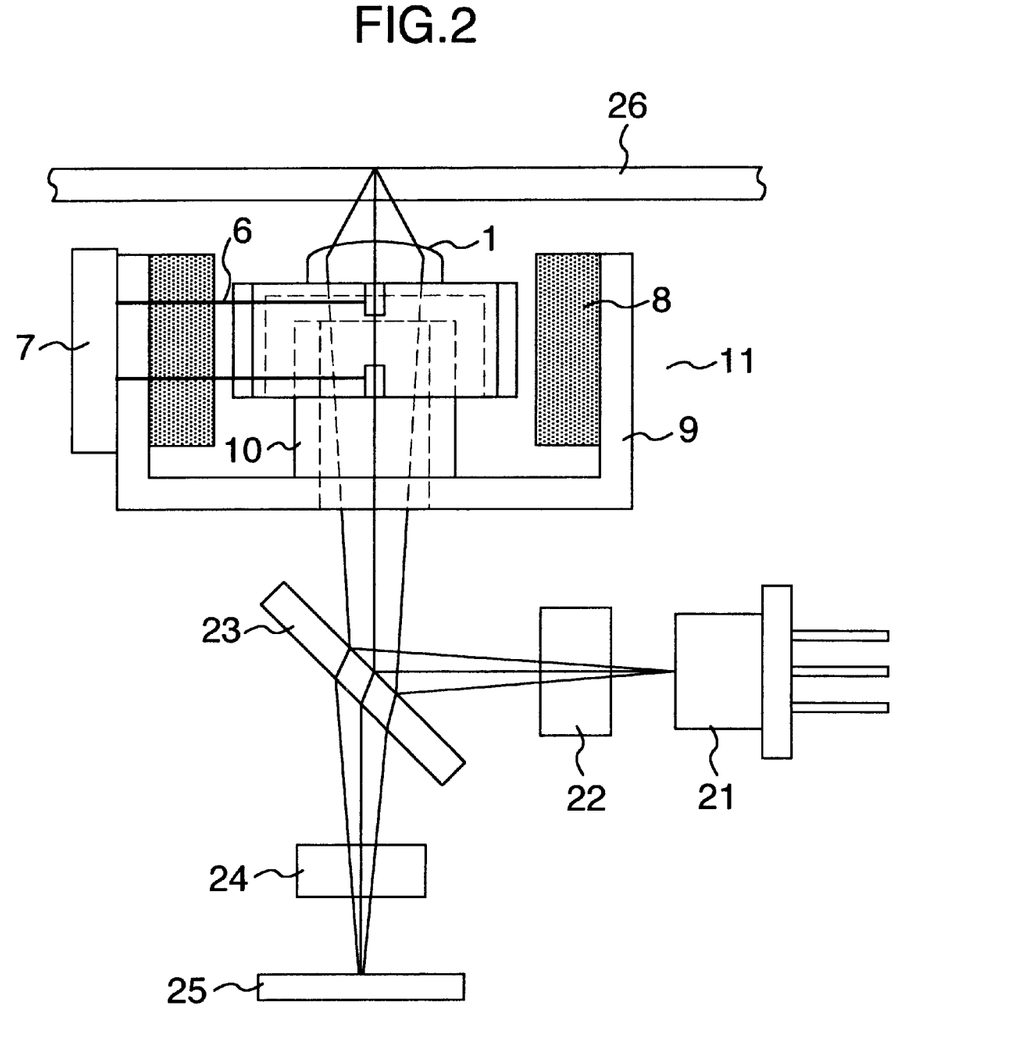
FIG. 2 is a view illustrating the configuration of a light pickup including the objective lens driving device according to the present invention.

FIG. 2 shows an embodiment of an optical disk drive using the objective lens driving device 11 according to the present invention. A disk 26 which is a recording medium is generally designed to be inserted into a not-shown device, put on a loading tray, carried to the position of a motor shaft, and attached to the motor shaft.

An optical head portion is constituted by a semiconductor laser element 21, a diffraction grating 22, a half mirror 23, a detection lens 24, a light detector 25, and the objective lens driving device 11.

Light emitted from the semiconductor laser element 21 passes through the diffraction grating 22. The light is then reflected on the half mirror 23, collected by the objective lens 1, and irradiated onto the disk 26 so as to be focused thereon. The light irradiated onto the disk 26 is reflected thereon. The reflected light enters the light detector 25 through the objective lens 1, the half mirror 23 and the detection lens 24. In the light detector 25, a focusing error signal, a tracking error signal and a playback signal are detected. The detected signals are sent to a not-shown control portion. In the control portion, the playback signal is outputted while the other signals are used to generate driving signals for driving the semiconductor laser element and the objective lens driving device. The objective lens driving device 11 shown in FIG. 2 has the configuration shown in FIG. 1. Although a finite optical system generally used in a CD-ROM drive or the like is shown in FIG. 2, the objective lens driving device according to the present invention is not limited to that which is shown in FIG. 2.

The inner yoke 10 is disposed inside the movable body 5, and formed into a substantially hollow square shape around a beam of light incident to the objective lens 1, as shown in FIGS. 1 and 2. Description will be made hereunder about the effect of the inner yoke provided in such a manner, with reference to FIGS. 3A and 3B and FIGS. 5A and 5B.

Figure 5A:
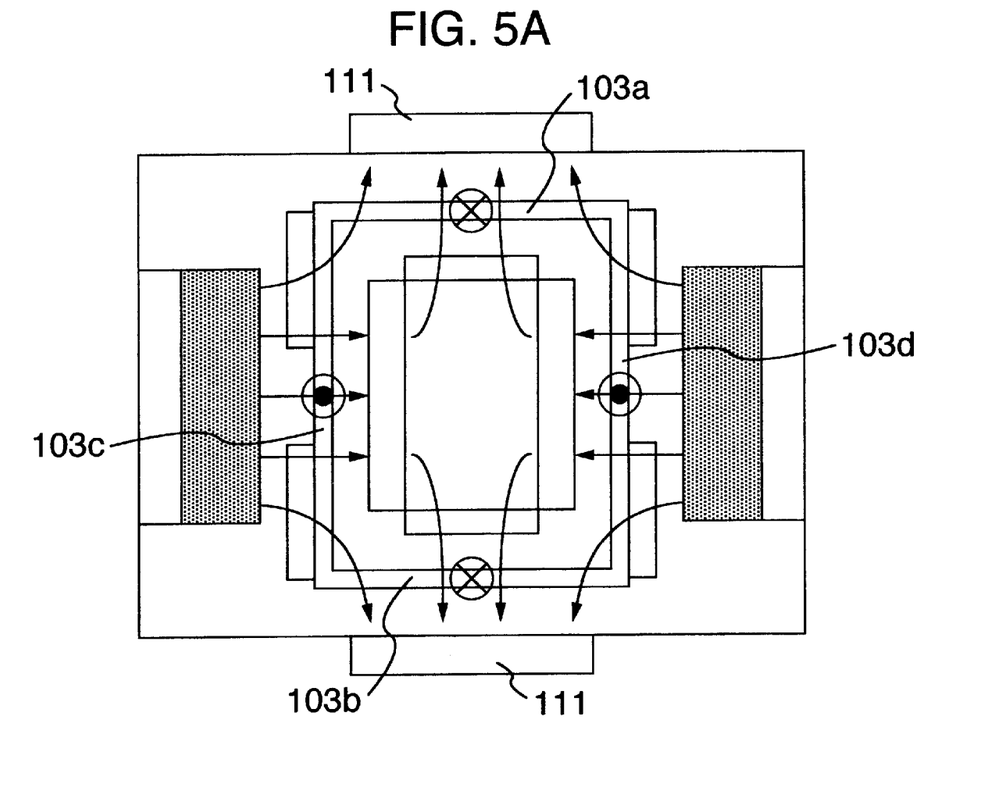
FIG. 5A is a plan view illustrating the flow of magnetic flux in a background-art objective lens driving device.
Figure 5B:
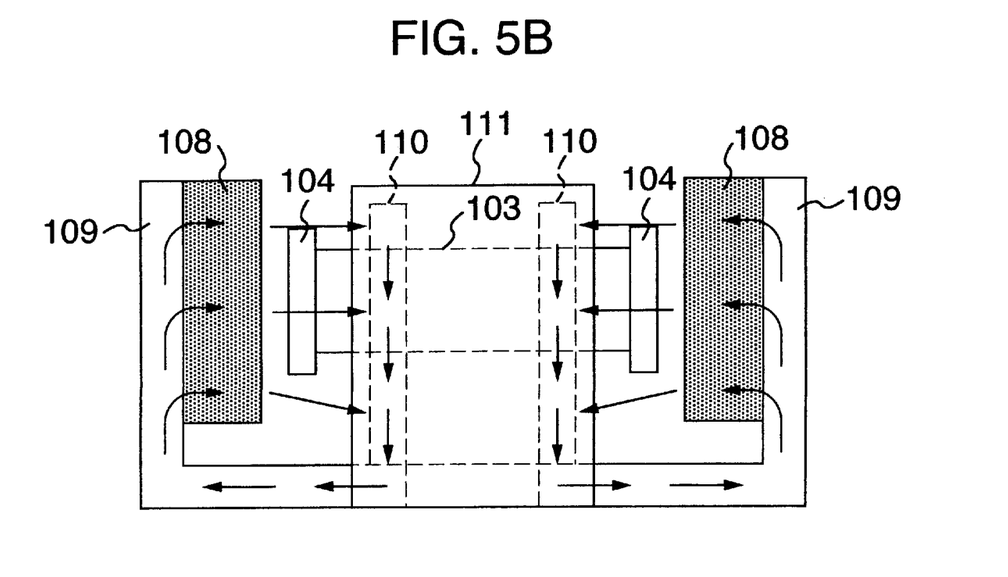
FIG. 5B is a side view illustrating the flow of magnetic flux in the background-art objective lens driving device.

FIGS. 3A and 3B show the flow of magnetic flux in the objective lens driving device according to the present invention while FIGS. 5A and 5B show the flow of magnetic flux in a background-art objective lens driving device. In FIGS. 3A and 3B and FIGS. 5A and 5B, in order to make the description easy, only the permanent magnets 8, the outer yoke 9, the inner yoke 10, the focusing coil 3 and the tracking coil 4 are shown while the objective lens 1, the lens holder 2, the supports 6 and the fixation member 7 are not shown.

First, in the background-art configuration of FIGS. 5A and 5B, if each of permanent magnets 108 is disposed so as to have an N-pole on the objective lens side and an S-pole on the outer yoke 109 side, magnetic flux from the permanent magnet 108 flows toward an inner yoke 110 opposite to the permanent magnet 108, and returns from the inner yoke 110 through the outer yoke 109 to the permanent magnet 108. When the magnetic poles are put reversely, the above-mentioned direction of the flow of the magnetic flux is reversed simply. The magnetic poles may be put in either order.

At this time, it is most desirable to make all the magnetic flux from the permanent magnets 108 return through the inner yoke 110. To this end, it is necessary to make the size of the inner yoke 110 large so that the inner yoke 110 is not saturated with the magnetic flux. However, as a practical matter, the size of the inner yoke 110 is limited in accordance with the limitation on the size of the driving device. Therefore, there is a magnetic flux leaking from the inner yoke 110. This leakage magnetic flux flows out to focusing coil portions 103a and 103b located perpendicularly to the radial direction of a disk. Further, if magnetic substances 111 are disposed outside the focusing coil portions 103a and 103b as disclosed in the background art, the leakage magnetic flux will be attracted to the focusing coil portions 103a and 103b more aggressively.

Here consider a force acting on the focusing coil 103. Assume that the direction of the force acting on focusing coil portions 103c and 103d located in the gaps between the permanent magnets 108 and the inner yoke 110 is a direction to this side of the paper surface from the other side, the direction of the force acting on the focusing coil portions 103a and 103b located perpendicularly to the radial direction of the disk will be a direction from this side of the paper surface to the other side. Since the direction of the force acting on the focusing coil portions 103c and 103d is effective, the force acting on the focusing coil portions 103a and 103b is opposite to the effective direction. Accordingly, the force acting on the focusing coil 103 as a whole is lowered.

On the other hand, in the configuration of the present invention shown in FIGS. 3A and 3B, if each of the permanent magnets 8 is disposed so as to have an N-pole on the objective lens side and an S-pole on the outer yoke 10 side, magnetic flux from the permanent magnet 8 flows toward the inner yoke 10 opposite to the permanent magnet 8, and returns from the inner yoke 10 to the permanent magnet 8 through the outer yoke 9. The magnetic poles may be put in either order as mentioned above. Then, leakage magnetic flux which cannot be absorbed in the inner yoke opposite to the permanent magnets 8 flows in the radial direction of a disk in the same manner as in the case of FIGS. 5A and 5B. In this case, however, the inner yoke is provided perpendicularly to the radial direction of the disk, so that the leakage magnetic flux can be further absorbed in this inner yoke portion. It is therefore possible to lower the unnecessary force acting on focusing coil portions 3a and 3b located perpendicularly to the radial direction of the disk in comparison with that in the background-art case shown in FIGS. 5A and 5B. Accordingly, it is possible to improve the force acting on the focusing coil 3 as a whole.

Here, it is an object of the inner yoke 10 to absorb the leakage magnetic flux acting on the focusing coil portions 3a and 3b located perpendicularly to the radial direction of the disk. It is therefore desirable that the height hiy of the upper end of the inner yoke 10 reaches the position of the focusing coil 3, and it is necessary that the height hiy is at least equal to or more than the height hml of the lower ends of the permanent magnets 8.

Further, in the configuration of the objective lens driving device according to the present invention, the inner yoke 10 is disposed inside the lens holder 2. Accordingly, it is possible to make the lens holder 2 smaller than that in the background-art configuration, and it is possible to make the lens holder 2 lighter in weight.

As a result, the thrust force is improved, and the movable body is made light in weight. It is therefore possible to improve acceleration produced in the objective lens driving device. By use of the objective lens driving device according to the present invention, it is possible to provide an optical disk unit capable of high-speed data transfer.

Figure 4A:
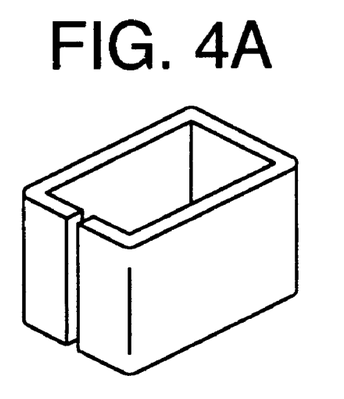
FIGS. 4A to 4E are views illustrating various embodiments of an inner yoke in the objective lens driving device according to the present invention.
Figure 4B:
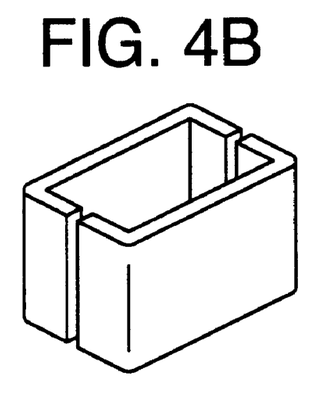
Figure 4C:
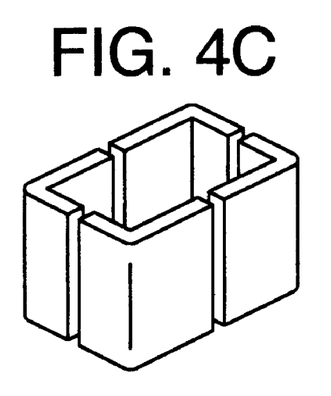
Figure 4D:
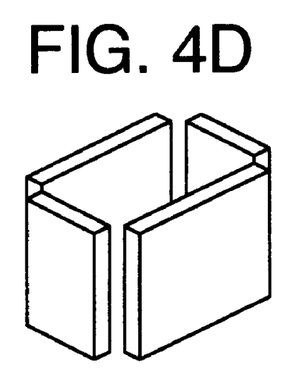
Figure 4E:
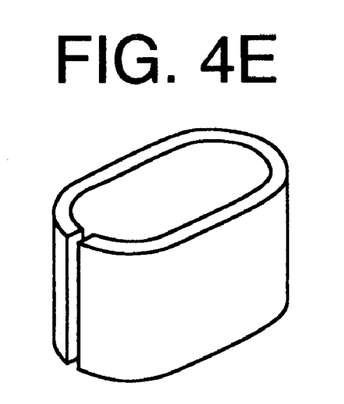

The shape of the inner yoke is not limited to that shown in FIG. 1 through FIGS. 3A and 3B. It is required that the inner yoke can absorb magnetic flux leaking perpendicularly to the radial direction of the disk as mentioned above. Therefore, the inner shape may be formed into any one of the shapes shown in FIGS. 4A through 4E. That is, the inner yoke may be formed by bending a sheet of magnetic substance as shown in FIG. 4A. In that case, it does not have any problem in performance even if there is a slight gap in a bonding portion of the sheet. The inner yoke may be also formed by bending and arranging a plurality of magnetic substances as shown in FIG. 4B or 4C. The inner yoke may be also formed by arranging a plurality of magnetic substances as shown in FIG. 4D. In any case, it is required that the inner yoke has at least two sides parallel with the radial direction of the disk and at least two sides perpendicular thereto. Alternatively, the inner yoke may be formed into an elliptic shape as shown in FIG. 4E. In that case, it is required that the inner yoke be disposed around a beam of light so as to absorb magnetic flux leaking perpendicularly to the radial direction of the disk.

Figure 6:
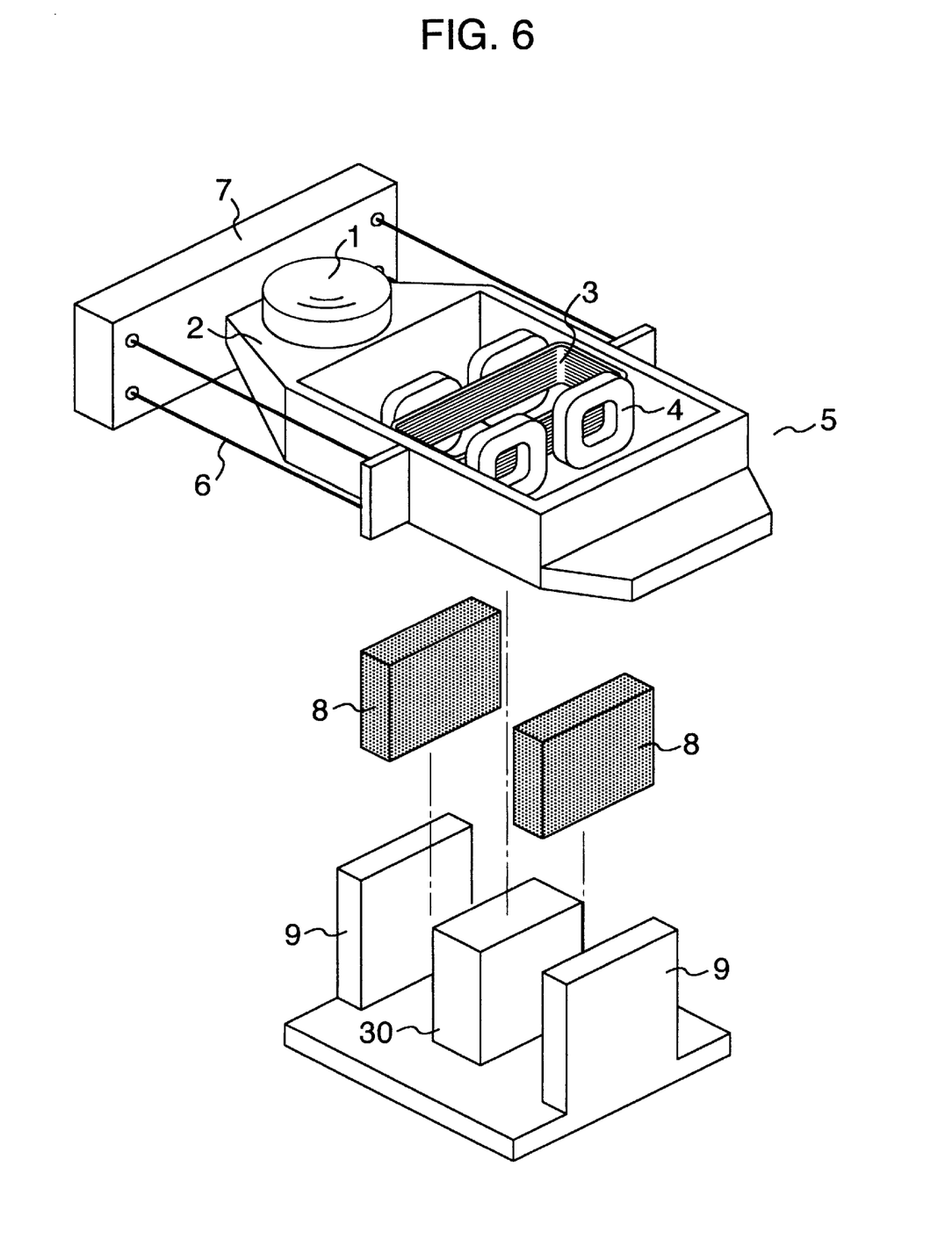
FIG. 6 is a view illustrating the configuration of another embodiment of an objective lens driving device according to the present invention.

FIG. 6 shows another embodiment of the present invention. A large difference between this embodiment and the embodiment described previously is as follows. In the embodiment described previously, the driving magnetic substance (inner yoke) is disposed in the lens holder portion for the objective lens. In this embodiment, however, an objective lens is put out of the center of a movable body 5, and a magnetic substance for an inner yoke 30 for driving the movable body is disposed in a position giving no influence to a light path. As a result, the light path of light travelling to the objective lens 1 and the inner yoke 30 do not interfere with each other. It is therefore possible to form the inner yoke 30 into a single solid shape. Accordingly, all the magnetic flux through the inner yoke 30 flows to the lower side where an outer yoke 9 is formed, and the magnetic flux returns to permanent magnets 8 through the outer yoke 9. By making the inner yoke 30 solid, magnetic flux absorbed in the inner yoke 30 can be further increased, so that it is possible to intend to further improve the thrust force.

As has been described, according to the present invention, an inner yoke is disposed around a beam of light inside a movable body of an objective lens driving device. Alternatively an inner yoke having at least two sides substantially parallel with the radial direction of a disk and at least two sides substantially perpendicular thereto is disposed inside the movable body. Accordingly, it is possible to lower leakage magnetic flux acting on a focusing coil portion located perpendicularly to the radial direction of the disk, and it is possible to improve the thrust force. Further, this configuration leads to making the movable body small in size and light in weight. Accordingly, it is possible to improve acceleration generated in the objective lens driving device. It is therefore possible to provide an optical disk drive capable of high-speed response if the objective lens driving device according to the present invention is used.

What is claimed is:

1. An objective lens driving device comprising:

an objective lens for irradiating at least reading light onto a recording surface of an optical disk which is an information recording medium, and for receiving light reflected on said recording surface; and a driving portion for focusing said objective lens on a focal position;

said driving portion including:

a movable body constituted by a lens holder for holding said objective lens, a focusing coil disposed on said lens holder, and a tracking coil disposed on said lens holder;

supports for supporting said movable body movably in a direction of an optical axis of said objective lens and in a radial direction of said optical disk;

a fixation member for fixing said supports;

permanent magnets giving magnetic force to said movable body; and an inner yoke constituted by a magnetic substance member and provided so as to enclose a light path to said objective lens inside said lens holder;

wherein an upper end of said inner yoke is positioned between an upper end and a lower end of said lens holder.

2. An objective lens driving device according to claim 1, wherein said inner yoke is formed into a substantially hollow square shape by use of at least one magnetic substance member.

3. An objective lens driving device according to claim 1, wherein said inner yoke is formed into a substantially elliptic shape by use of at least one magnetic substance member.

4. An objective lens driving device comprising:

an objective lens for irradiating at least reading light onto a recording surface of an optical disk which is an information recording medium, and for receiving light reflected on said recording surface; and a driving portion for focusing said objective lens on a focal position;

said driving portion including:

a movable body constituted by a lens holder for holding said objective lens, a focusing coil disposed on said lens holder, and a tracking coil disposed on said lens holder;

supports for supporting said movable body movably in a direction of an optical axis of said objective lens and in a radial direction of said optical disk;

a fixation member for fixing said supports;

permanent magnets giving magnetic force to said movable body; and an inner yoke disposed inside said lens holder, and constituted by a magnetic substance member having at least two sides substantially parallel with the radial direction of said optical disk and at least two sides perpendicular to the radial direction of said optical disk.

5. An objective lens driving device comprising:

an objective lens for irradiating at least reading light onto a recording surface of an optical disk which is an information recording medium, and for receiving light reflected on said recording surface; and a driving portion for focusing said objective lens on a focal position;

said driving portion including:
- a movable body constituted by said objective lens, a lens holder for holding said objective lens, and a focusing coil and a tracking coil both of which are disposed on said lens holder;
- supports for supporting said movable body movably in a direction of an optical axis of said objective lens and in a radial direction of said optical disk;
- a fixation member for fixing said supports;
- permanent magnets facing each other through said focusing coil and said tracking coil; and
- an inner yoke disposed inside said focusing coil, said inner yoke being constituted by a solid magnetic body.

6. An optical disk drive comprising:

an optical disk which is an information recording medium;

a light source for generating laser light;

an objective lens for collecting light from said light source onto a recording surface of said optical disk;

a movable body provided with said objective lens, said movable body including a lens holder for holding said objective lens, a focusing coil disposed on said lens holder, and a tracking coil disposed on said lens holder;

a light detector for detecting a recording/playback signal, a tracking error signal and a focusing error signal on the basis of light reflected from said recording surface; and a control portion for controlling said movable body and said light source on the basis of outputs of said light detector;

supports for supporting said movable body movably in a direction of an optical axis of said objective lens and in a radial direction of said optical disk;

a fixation member for fixing said supports;

permanent magnets giving magnetic force to said movable body; and an inner yoke constituted by a magnetic substance member enclosing a light path to said objective lens inside said lens holder;

wherein an upper end of said inner yoke is positioned between an upper end and a lower end of said lens holder.

* * * * *